A. V. L. VERNEUIL.
PROCESS OF PRODUCING SYNTHETIC SAPPHIRES.
APPLICATION FILED MAY 10, 1910.
988,230.
Patented Mar. 28, 1911.
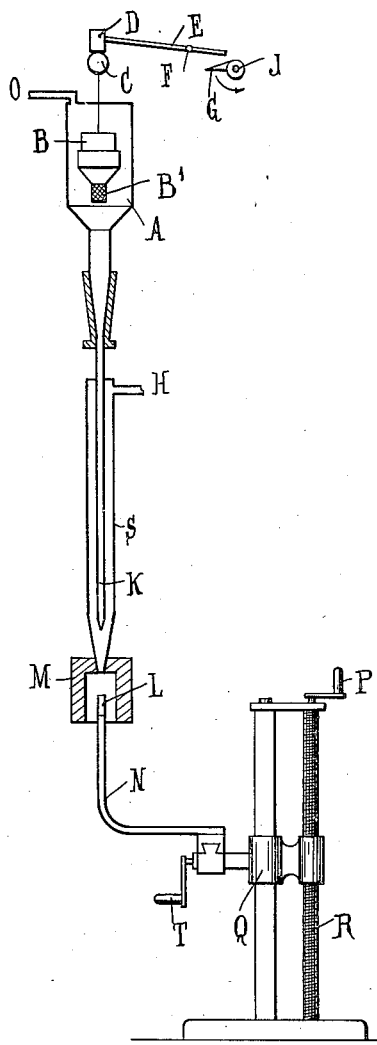
Fig. 1.
    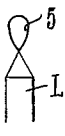
Fig. 2  Fig. 3  Fig. 4  Fig. 5  Fig. 6.

UNITED STATES PATENT OFFICE.

AUGUSTE VICTOR LOUIS VERNEUIL, OF PARIS, FRANCE, ASSIGNOR TO L. HELLER & SON, OF NEW YORK, N. Y.

PROCESS OF PRODUCING SYNTHETIC SAPPHIRES.

988,230.  Specification of Letters Patent.  Patented Mar. 28, 1911.

Application filed May 10, 1910. Serial No. 560,420.

*To all whom it may concern:*

Be it known that I, AUGUSTE VICTOR LOUIS VERNEUIL, a citizen of the French Republic, residing at 80 Boulevard St. Germain, Paris, France, have invented certain new and useful Improvements in Processes of Producing Synthetic Sapphires.

The sapphire produced according to this invention is substantially identical in chemical and physical properties with, and exactly similar in appearance to the blue sapphire found in nature.

Various artificial gems have already been manufactured synthetically, such as rubies, but up to the present it has been impossible to produce a stone having the blue color, and of a nature indistinguishable from that of a natural sapphire.

The apparatus used is the same as that used in the manufacture of artificial rubies and consists essentially in a blowpipe producing an oxy-hydrogen flame.

The materials which are used in re-constituting a sapphire are alumina, oxid of iron and oxid of titanium, these elements being the elements normally composing the natural stone. The said constituent materials are powdered, mixed and are caused to fall through the flame on to a column or support of fire clay or other refractory substance where they are fused and form the artificial stone as will be more particularly described below.

In the accompanying drawings, Figure 1 is a diagrammatic view of the apparatus used and, Figs. 2–6 show the artificial stone at different stages of the process.

The apparatus herein shown is old and is only shown herein for the purpose of more easily describing the present invention. Oxygen is led from a suitable source through the pipe O into the chamber A which latter contains a receptacle B for the powder forming the composition of the artificial stone. The lower end of this receptacle B terminates in a sieve like portion B' composed of wire gauze or similar material of sufficiently fine mesh to prevent the powder falling freely through. The upper end of the receptacle has attached to it a rod passing through an air-tight joint in the top of the chamber A, and provided at its upper end with a block C. The block C is placed within reach of a hammer D fixed to a rod E pivoted at F. The end of the rod E remote from D is adapted to be depressed by a cam G on a shaft J, rotating in the direction of the arrow. As the cam engages the end of rod E the hammer D is raised and when the cam escapes from engagment with rod E, the hammer D falls and imparts a shock to the sieve B' through the block C. In this way a small quantity of the powder falls intermittently through the opening in the lower part of the chamber A and through pipe K.

Lighting or other gas fed through opening H, passes down pipe S and at the mouth of the latter mingles with the oxygen to form the flame which is inclosed by a casing M of a refractory substance.

When starting the process, the oxygen is only fed in a small quantity so that the flame is relatively cold. The powder falling down onto the fire clay column or support L is accordingly not fused, but merely baked or fritted, and gradually forms a pyramid 1 of the shape shown in Fig. 2. As the cone rises, the flame acts directly on the point of the cone which being of very small mass is fused and the powder as is well known passes from the powdered state instantaneously to the crystalline state at the moment of fusion, forming a small stalk 2 of crystalline formation, see Fig. 3. The proportion of oxygen in the flame is then gradually increased and the powder falling down fuses and forms a bulb of gradually increasing size as shown, 3, 4, 5 in Figs. 4, 5 and 6. The flame is then shut off and the finished stone allowed to cool. The position of the fire clay column L relative to the flame can be adjusted by means of the rod N, bracket Q, screwed rod R and handles T and P.

Another essential feature of my invention resides in the process by means of which we are enabled to produce or reconstitute a sapphire corresponding in color and all its physical and chemical properties with the sapphire as found in nature. The process consists, broadly speaking, in combining alumina, iron and titanium in the form of oxids. As these substances in a powdered condition fall through the flame, the reaction first consists in the reduction of the oxid of iron to a lower oxid, and then in the simultaneous oxidation of the lower oxid of iron to the sesqui-oxid ($Fe_2O_3$) and the reduction of the oxid of titanium to a lower oxid. The blue color of the stone thus ultimately obtained is due to the lower oxid of titanium and the function of the oxid of iron is that of a reducing agent.

When the cone 1 shown in Fig. 2 is formed, the mixture of alumina and the above oxids of iron and titanium then fuses and the sapphire forms gradually as described above and shown in Figs. 2-6.

The proportions of the powdered ingredients are substantially 98% alumina, 1.5% ferrous oxid of iron and 0.5% oxid of titanium.

Other compounds of aluminium, iron and titanium could be used to form the ingredients of the powder besides the oxids above mentioned, owing to the fact that the flame, whose temperature during the formation of the stone should be kept at about 1900° C. would reduce any other compounds of these metals which may be employed, to the state of oxids during the passage through the flame, as at this temperature only the oxids of these metals are stable. If other compounds of these metals are used, the proportions in which they enter into the composition of the powder must obviously be correspondingly altered to give the final proportions above mentioned. I wish it to be understood that it is not absolutely necessary to combine the powder of alumina with the oxids of titanium and iron which are prepared in the usual manner. One can start with the sulfates, carbonates or other compounds or even the pure metals could be used, provided, as already stated, the proportions are correspondingly varied. If, for example, the composition for making the synthetic sapphire is aluminium sulfate, pure iron and the oxid of titanium the proportion of the ingredients is 99.74% of $Al_2(SO_4)3+18H_2O$; O, 18% of Fe and 0.08% of $TiO_2$.

For any other compounds of the three metallic elements the proportions of the ingredients could be easily calculated by any one versed in the science of chemistry.

Should the ingredients of the composition for making the synthetic sapphire be other than the oxids of the three metallic elements, a preliminary step is taken before the powders are put into receptacle B. This step consists in calcining the ingredients for about an hour in any suitable furnace which is kept at a temperature of about 1000° C.

I claim:

1. A process of producing synthetic sapphires consisting in causing compounds of aluminium, iron and titanium to be subjected to a flame, in converting the same to alumina, oxid of iron and oxid of titanium and in fusing said alumina, oxid of iron and oxid of titanium together.

2. A process of producing synthetic sapphires consisting in causing alumina, oxid of iron and oxid of titanium to be fused together.

3. A process of producing synthetic sapphires consisting in causing powdered alumina, oxid of iron and oxid of titanium to be fused together.

4. A process of producing synthetic sapphires consisting in causing an aluminium compound, an iron compound and a titanium compound to be subjected to a flame, in reducing the same to alumina, oxid of iron and oxid of titanium and in fusing said alumina, oxid of iron and oxid of titanium together.

5. The process of producing synthetic sapphires, which consists in heating sulfate of aluminium, sulfate of iron, and sulfate of titanium until they are reduced to oxids and then continuing the heating to the fusing point.

6. A process of producing synthetic sapphires consisting in first calcining a compound of aluminium, a compound of iron and a compound of titanium and then fusing them together.

7. A process of producing synthetic sapphires consisting in causing a compound of aluminium, a compound of iron and a compound of titanium to be fused together.

8. The process of producing synthetic precious stones which consists in preparing a mixture containing aluminium, iron and titanium in proportions adapted to produce a sapphire containing substantially 98% aluminium oxid, 1.5% iron oxid, 0.5% titanium oxid; and in subjecting said mixture to a temperature suitable for producing said oxids in the form desired, substantially as described.

9. A composition of matter adapted to produce sapphires and containing aluminium, iron and titanium in such proportions that when heated to a suitable temperature there will be produced a mass containing substantially 98% aluminium oxid, 1.5% iron oxid, and 0.5% titanium oxid, substantially as described.

AUGUSTE VICTOR LOUIS VERNEUIL.

Witnesses:
 LOUIS RINNY,
 DEAN B. MASON.